United States Patent [19]

Burcher et al.

[11] Patent Number: 4,468,701

[45] Date of Patent: Aug. 28, 1984

[54] VIDEO SIGNAL ACTUATED SWITCH

[75] Inventors: Dennis S. Burcher; David M. Dickson; Jeffrey A. Walters, all of Indianapolis, Ind.

[73] Assignee: Bell Telephone Laboratories, Incorporated, Murray Hill, N.J.

[21] Appl. No.: 295,753

[22] Filed: Aug. 24, 1981

[51] Int. Cl.³ .............................................. H04N 5/22
[52] U.S. Cl. .................................... 358/181; 358/183
[58] Field of Search ...................... 358/181, 183, 188; 360/4; 307/243, 256, 257, 259, 244; 455/133–135; 328/97, 101, 104, 137, 154; 340/147 C, 147 LP, 147 CN

[56] References Cited

U.S. PATENT DOCUMENTS

| | | | |
|---|---|---|---|
| 4,361,854 | 11/1982 | Wolfe | 358/181 |
| 4,363,033 | 12/1982 | Lovely | 358/181 |
| 4,400,735 | 8/1983 | Strammello | 358/181 |

Primary Examiner—Michael A. Masinick
Attorney, Agent, or Firm—H. L. Newman

[57] ABSTRACT

A video signal actuated switch is disclosed having general application in the area of video home entertainment systems. The present video signal actuated switch comprises an impedance matching circuit (200) for matching the impedance of an incoming video signal (VS) for display. A high impedance amplifier (201), having an associated filtering circuit (201a), amplifies a particular band of frequencies comprising a known component frequency of the video signal (VS). No significant degradation of the standard video signal results from the application of the impedance matching circuit (200) in combination with the amplifier circuit (201). An actuator circuit (202) provides a signal (F) responsive to the output of the amplifier circuit (201) to a control circuit (203). The control circuit (203), responsive to signal (F), provides a control signal (E) for controlling the selection of video inputs to a video terminal (100) and for controlling or powering an RF modulator circuit (206). RF modulator circuit (206), responsive to control circuit (203), permits video signal (VS) to modulate a particular television channel frequency. Antenna switch (205), responsive to the control signal (E), preempts the viewing of antenna signal (G) at video terminal (100) in favor of the modulated output of modulator circuit (206).

15 Claims, 4 Drawing Figures

VIDEO SIGNAL ACTUATED SWITCH

BACKGROUND OF THE INVENTION

1. Technical Field

The present invention relates generally to video home entertainment systems, and particularly to switching apparatus for permitting a television set to operate in either its normal mode of use or as a data terminal.

2. Description of the Prior Art

In the general field of video home entertainment systems, a problem has arisen in that it is desirable to employ one's television as a video multi-purpose terminal as well as in its normal mode of use for radio frequency reception. In order to employ the television set, for example, with a video game system, the owner of the television set generally must reach around to the rear of the television to manually switch from RF antenna reception to local reception. Besides the field of video games, home computer terminals and video tape and disc recording and playing equipment generally require this same manual actuation of an antenna switch from RF antenna to local reception.

Yu, U.S. Pat. No. 4,092,897, discloses a video record player switching system which automatically disassociates a TV antenna lead-in upon turning on a video tape recorder. While Yu eliminates the manual actuation of the antenna switch, the antenna lead-in is switched to video record player reception at the video record player by activating the on/off switch of the video tape recorder. The switching function is integrally associated with the on/off switch and the antenna lead-in must appear at the video tape recorder.

Since the television set is normally provided with its own local antenna, it is believed desirable that an antenna switch at the television set necessary for the aforementioned game and data terminal features be remotely actuatable. To this end, it is desirable to employ the video signal provided by the associated video recording, game or data terminal apparatus to perform the remote actuation. On the other hand, the provided video signal must not be significantly degraded, otherwise, the quality of the video signal when displayed might suffer.

SUMMARY OF THE INVENTION

The above-noted problems are solved and the desired results achieved by a video signal actuated switch in accordance with the present invention wherein an illustrative embodiment comprises a circuit for matching the impedance of an incoming video signal. Connected to the impedance matching circuit is a high impedance amplifier circuit. The amplifier circuit, having an associated filtering circuit, amplifies a band of electrical frequencies comprising a known component frequency of the video signal such as, for example, the horizontal or line rate frequency. The high impedance amplifier in combination with the impedance matching circuit does not significantly degrade the quality of the video signal. The amplified signal is then rectified or, in an alternative embodiment, operates an opto-isolator. The output of the rectifier or the opto-isolator actuates means for remotely controlling the operation of the antenna switch. The control means may also be employed to provide power to an RF modulator for modulating the video signal by a particular television channel frequency for television antenna lead-in reception. In view of the above-described embodiment, it is clear that the present video signal actuated switch precludes a requirement for manual actuation of the antenna switch or for the antenna lead-in to appear elsewhere than at the television set.

DETAILED DESCRIPTION

Figure 1:
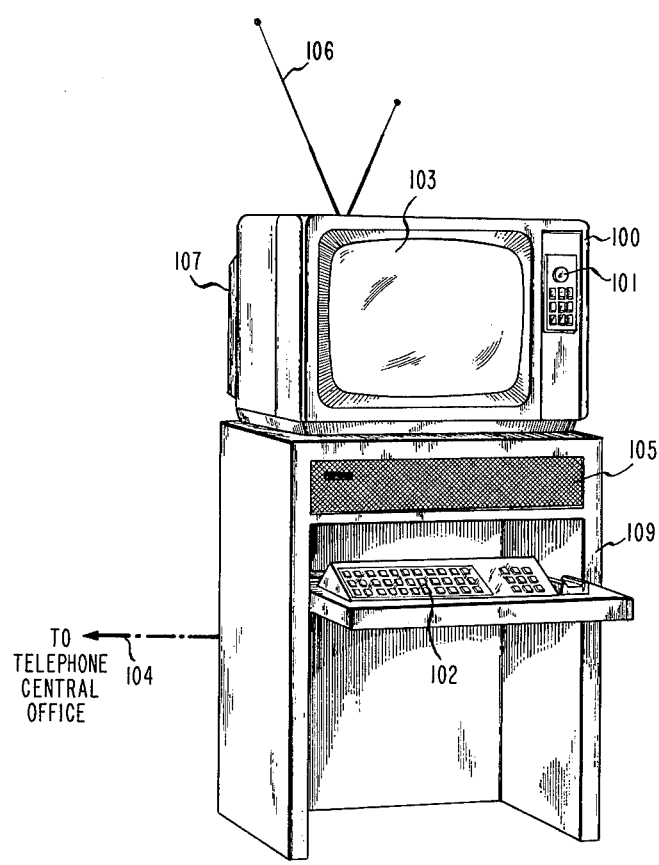
FIG. 1 is a pictorial representation of a video terminal for providing viewdata service which may be one application of the present video signal actuated switch.

Referring more particularly to FIG. 1, there is shown a pictorial representation of a viewdata service terminal 109 for providing viewdata service, which may be one application of the present video signal actuated switch. Viewdata service generally entails the provision of an encoded signal over a telephone line 104 from a telephone central office. A data transceiver and control unit 105 transforms the received signal into a standard video signal format for display on screen 103 of a video terminal 100. A viewdata service customer is provided with a keyboard 102 or other means for interacting with a central data base of the viewdata service provider over the telephone line 104.

Video terminal 100 most desirably is a color or black and white television set. It is believed that a considerable savings to a viewdata service customer can be achieved if the television set the customer already has can be employed to provide viewdata service. Other alternatives include color or black and white television signal monitors, liquid crystal display terminals, light emitting diode arrays, or video projections systems.

The alternative types of video terminal may necessitate the provision of various standard video signal inputs or the development and application of new formats. In addition, other countries have developed their own formats. When other formats of input video signals or other types of video terminals are employed, certain variations in the design of elements of the present video signal actuated switch may be required. These concerns will be addressed as the design of each element of the present video signal actuated switch is discussed.

A viewdata service terminal typifies a problem generally applicable to video home entertainment systems of any type comprising, for example, video games, home computer terminals, and video tape and disc recording and playing equipment. When the viewdata service customer wishes to view television channels received over TV antenna 106, the customer must make sure that an antenna or other switch connected at a lead-in terminal 107 on the rear of the video terminal 100 is in the appropriate position for RF reception. In addition, the user actuates on/off switch 101 of video terminal 100 and tunes the set to a desired RF channel.

For viewdata service operation, the user must set the antenna switch for local input by again reaching behind the video terminal. The user additionally must ensure that the television channel for viewdata service is selected which may be accomplished by means of a portable remote control unit.

With the application of the present video signal actuated switch, the presence of a video signal for display causes the switching of inputs to video terminal 100. In this manner, the user is saved the problem of having to reach around to the rear of the terminal to manually throw an antenna or other switch from one position to another.

Figure 2:
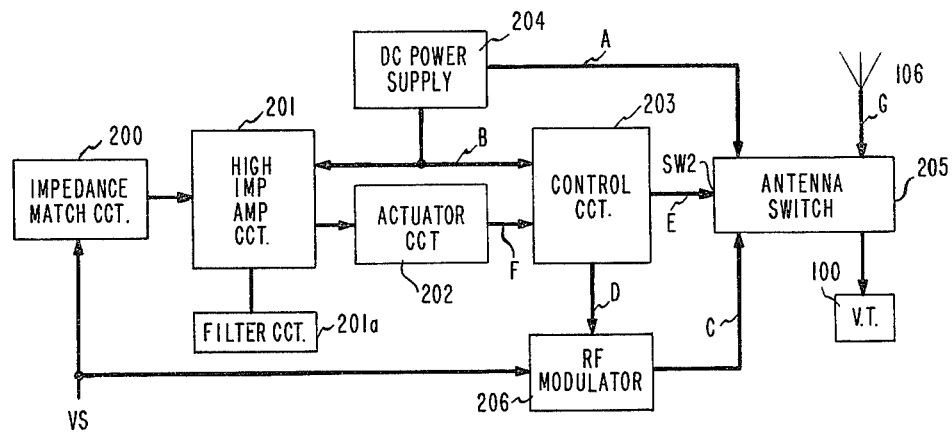
FIG. 2 is a general block diagram of a video signal actuated switch in accordance with the principles of the present invention.

Referring more particularly to FIG. 2, there is shown a general block diagram of the present video signal actuated switch. Similar reference characters are used in FIGS. 1, 2, 3, and 4 to represent similar elements whenever possible.

The video signal actuated switch comprises a circuit 200 for matching the impedance of an incoming video signal VS to the input impedance of the amplifier circuit 201. Impedance matching circuit 200 is generally designed to match a 75Ω video signal impedance. A 75Ω impedance is appropriate if the incoming video signal VS is (1) a National Television Standards Committee (NTSC) video signal, (2) a red, green, blue (RGB) video synchronization signal, or (3) a video signal in the European standard format. It is believed well known in the art that matching impedances promotes optimum transmission.

In certain telephone transmission applications, a 135Ω impedance is standard. In that application and other applications where some other impedance is specified, it is believed that impedance matching circuit 200 may be designed to match that particular impedance. In some situations, it may be possible to eliminate impedance matching circuit 200, as, for example, when a perfect match of the video signal VS to amplifier circuit 201 is not required or when RF modulator 206 provides a 75Ω or other required input impedance.

Amplifier circuit 201 is designed to present a high impedance to the output of impedance matching circuit 200. It is desirable that the video signal not be significantly degraded in quality or attenuated, because video signal VS is viewed on video terminal 100. Accordingly, amplifier circuit 201 serves a buffering function and also provides gain if required.

Filter circuit 201a tunes amplifier circuit 201 to a particular band of frequencies comprising a known component frequency of the particular incoming video signal VS. It is believed that, for any format of video signal VS, there is at least one component frequency that is always present. For example, the RGB and the NTSC composite video signal vertical and horizontal synchronization rates are 60 Hz and 15,750 Hz, respectively. Since the 15,750 Hz horizontal synchronization rate is inherently easier to amplify, it is probably a better choice than the 60 Hz vertical synchronization rate for the center tuning frequency of filter circuit 201a.

With respect to the European standard video signal, the vertical and horizontal synchronization rates are 50 Hz and 15,625 Hz, respectively. If a European standard video signal VS is applied, its particular tuning frequency for design of filter circuit 201a is probably best chosen at 15,625 Hz. Accordingly, it is believed most desirable to design filter circuit 201a to pass a band of frequencies between fifteen and sixteen thousand Hertz to achieve a universal application for the present video signal actuated switch.

Actuator circuit 202 provides a signal F to control circuit 203 responsive to the presence of an output from amplifier circuit 201. Accordingly, if video signal VS is present at the input of impedance matching circuit 200, then actuator circuit 200 provides signal F for operating control circuit 203. In addition, video signal VS if present is applied by a separate path to RF modulator 206.

Control circuit 203, responsive to the presence of signal F, provides power or control signal D for actuating RF modulator 206 and additionally provides control signal E to operate antenna switch 205. RF modulator 206 permits video signal VS to modulate a particular television channel frequency. Modulated television signal C is thereby provided to antenna switch 205. Any commercially known modulator circuit may be employed. One such circuit for operation at +12 volts, so that control signal D may be the same +12 volt signal as control signal E, is the Alps Model MK2 modulator.

DC power supply 204 provides DC voltage signal B to power control circuit 203 and amplifier circuit 201. In addition, power supply 204 provides DC voltage signal A to antenna switch 205 for maintaining antenna switch 205 in a particular state.

Antenna switch 205, responsive to control signal E, preempts antenna signal C from antenna 106 in favor of modulated signal C. As a result, modulated signal C is viewed on video terminal 100, provided video terminal 100 is set at the television channel frequency of modulator 206. Antenna switch 205 may be any commercially available switch for selecting between inputs which is operable by a control signal. One device which is remotely actuable and mountable on the rear of a television set is the model MZD switch manufactured by Alps Electric Co., Ltd. The Alps Model MZD switch requires a reference signal A of +6 volts and a control signal E of 0 or +12 volts.

Figure 3:
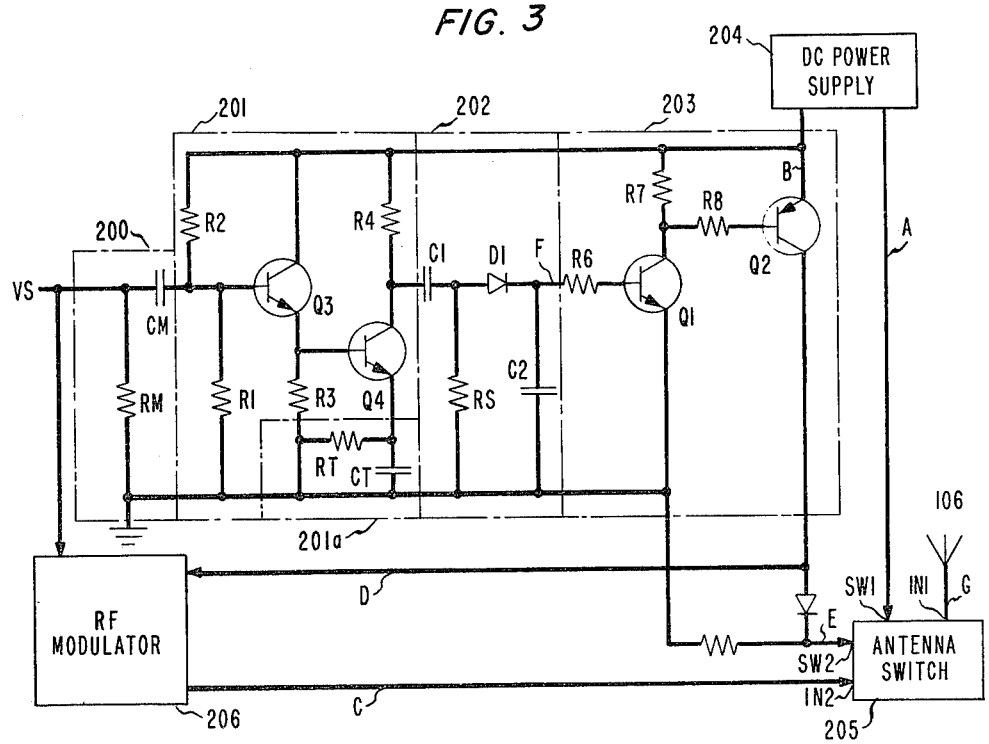
FIG. 3 is a detailed schematic drawing of one embodiment of a video signal actuated switch in accordance with the general block diagram of FIG. 2.

Referring more particularly to FIG. 3, one particular embodiment of the present video signal actuated switch is shown. Its design in comparison with the block diagram of FIG. 2 will now be discussed in detail.

Impedance matching circuit 200 comprises resistor RM and capacitor CM. For example, resistor RM is 75Ω when the present video signal actuated switch is used with most video signal formats. Capacitor CM is provided for AC coupling the video signal VS with the high impedance input of amplifier circuit 201.

High impedance amplifier circuit 201 comprises transistors Q3 and Q4 and resistors R1, R2, R3, and R4. In particular, R1 and R2 are chosen to provide a high input impedance on the order of 10,000Ω; and transistors Q3 and Q4 provide a buffer stage and a stage of gain, respectively.

Filter resistor RT and capacitor CT comprise circuit 201a for causing the amplifier circuit to pass a particular band of frequencies between fifteen and sixteen thousand Hertz.

Actuator circuit 202 comprises a half-wave rectifier circuit having a coupling capacitor C1, a resistor R5, a rectifier diode D1 and a wave smoothing capacitor $C_2$. A smoothed direct current actuating signal F is provided to control circuit 203 responsive to the output of amplifier circuit 201.

Control circuit 203 comprises transistors Q1 and Q2 and resistors R6, R7, and R8. Responsive to signal F, the base of transistor Q1 is high. As a result, the base of transistor Q2 is low. Accordingly, transistor Q2 transmits DC voltage signal B, becoming signal D, for controlling or powering RF modulator 206. Likewise, signal B becomes control signal E for controlling the operation of antenna switch 205.

Accordingly, when video signal VS is present at the input to circuit 200, control signal E is present at antenna switch 205. Responsive to control signal E, antenna switch 205 switches from signal G at terminal IN1 to modulated signal C at terminal IN2. Modulated signal C then is transmitted to the antenna terminal 107 of video terminal 100 in the place of antenna signal G from antenna 106.

In the alternative, if no video signal VS is present at the input to circuit 200, no signal F is provided, and the base of transistor Q1 is low. As a result, the base of transistor Q2 is high. Accordingly, no signal E is transmitted to antenna switch 205. In this case, signal A continues to maintain antenna switch 205 in an unswitched status permitting antenna signal G to be transmitted to antenna terminal 107 of video terminal 100.

Figure 4:
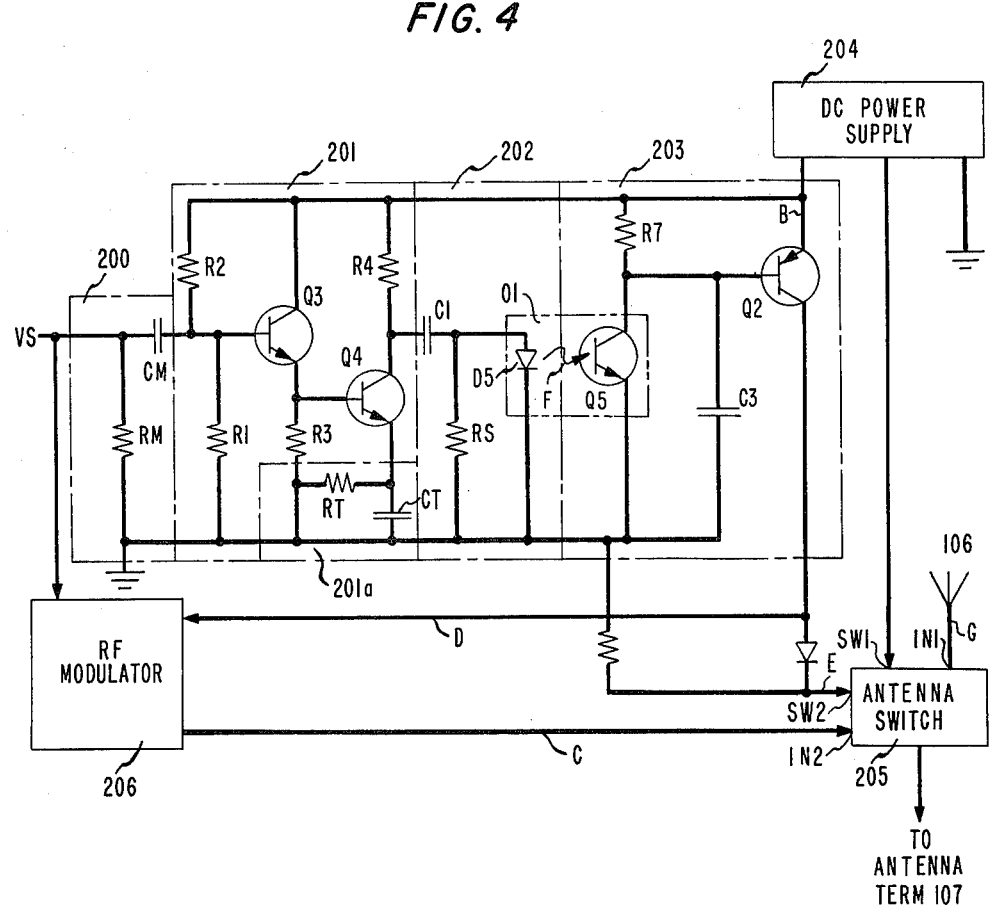
FIG. 4 is a detailed schematic drawing of a second embodiment of a video signal actuated switch in accordance with the general block diagram of FIG. 2.

Referring to FIG. 4, a detailed schematic drawing of a second embodiment of a video signal actuated switch is shown in accordance with the general block diagram of FIG. 2. It comprises many of the same elements of the embodiment of FIG. 3; however, there are particular differences in the composition of actuator circuit 202 and of control circuit 203.

In particular, in actuator circuit 202, diode D1 is replaced by light emitting diode D5. Diode D5 provides a light signal F for actuating the base of photo-responsive transistor Q5 of control circuit 203, photo-responsive transistor Q5 replacing transistor Q1.

Light signal F is a pulsing or strobe light signal. Accordingly, the electrical output of photo-responsive transistor Q5 is smoothed by the influence of wave smoothing capacitor C3. In this manner, the base of transistor Q2 is provided a relatively constant signal for closing the emitter to collector path of transistor Q2.

Opto-isolator O1 comprises light emitting diode D5 and photo-responsive transistor Q5. It provides the advantage of electrically isolating amplifier 201 from control circuit 203. While high impedance buffer amplifier Q3 provides considerable isolation in itself, opto-isolator O1 provides complete electrical isolation. In all other respects, the operation of the embodiment of FIG. 4 is identical to the operation of the embodiment of FIG. 3.

What is claimed is:
1. A video signal actuated switch
characterized by
an amplifier circuit (201) for amplifying a particular band of frequencies comprising a known component frequency of a video signal (VS), the amplifier circuit providing an output signal,
an actuator circuit (202) for providing an actuating signal (F) responsive to the output signal of the amplifier circuit (201), and
a control circuit (203), responsive to the actuating signal (F) of the actuator circuit (202), for controlling the selection of signals (C and G) for display by a video terminal (100).
2. A video signal actuated switch as recited in claim 1
further characterized by
an impedance matching circuit (200) for matching the impedance of the video signal (VS) to the impedance of the amplifier circuit (201).
3. A video signal actuated switch as recited in claim 1
further characterized by a filter circuit (201a) for tuning the amplifier circuit (201) to the known component frequency of the video signal (VS).
4. A video signal actuated switch as recited in claim 3
further characterized by
an impedance matching circuit (200) for matching the impedance of the video signal (VS) to the amplifier circuit (201).
5. A video signal actuated switch as recited in claim 1
further characterized in that
the control circuit (203) comprises a means for providing a signal (D) for controlling an RF modulator and for providing a signal (E) for controlling the selection of inputs (G and C) to the video terminal (100).
6. A video signal actuated switch
characterized by
an amplifier circuit (201) for amplifying a particular band of frequencies comprising a known component frequency of a video signal (VS), the amplifier circuit providing an output signal,
an actuator circuit (202) for providing an output signal responsive to the output signal of the amplifier circuit (201).
a control circuit (203), responsive to the output signal of the actuator circuit (202), for providing a signal (D) for powering an RF modulator (206), and
a switch (205), responsive to the control circuit (203), for switching between inputs (G and C) to a video terminal (100).
7. A video signal actuated switch as recited in claim 6
further characterized by
a filter circuit (201a) for tuning the amplifier circuit (201) to the known component frequency of the video signal (VS).
8. A video signal actuated switch
characterized by
an amplifier circuit (201) for amplifying a particular band of frequencies comprising a known component frequency of a video signal (VS), the amplifier circuit providing an output signal,
an actuator circuit (202) for providing an output signal responsive to the output signal of the amplifier circuit (201),
a control circuit (203), responsive to the output signal of the actuator circuit (202), for providing first and second signals (D and E);
a modulator (206), responsive to the first signal (D) and the video signal (VS), for modulating the video signal (VS) to a particular television channel frequency, and
a switch (205), responsive to the second signal (E), for switching between two inputs (C and G) to a video terminal (100).
9. A video signal actuated switch as recited in claim 8
characterized by
a circuit (200) for matching the impedance of the video signal (VS) to the input impedance of the amplifier (201).
10. A video signal actuated switch
characterized by
an impedance matching circuit (200) for matching the impedance of a video signal (VS), the impedance matching circuit providing an output signal, a high impedance amplifier circuit (201) for providing an output signal responsive to the output signal of the impedance matching circuit (200), an actuator circuit (202) to providing an output signal responsive to the output signal of the amplifier circuit (201), a control circuit (203), responsive to the output signal of the actuator circuit (202), for providing first and second signals (D and E), a modulator (206), responsive to the first signal (D) and the video signal (VS), for modulating the video signal to a particular television channel frequency, and a switch (205), responsive to the second signal (E), for switching between two inputs (C and G) to a video terminal (100), one input being the output (C) of the modulator (206).

11. A video signal actuated switch
characterized by
an amplifier circuit (201) for amplifying an electrical signal of a known component frequency of a video signal (VS), the amplifier circuit providing an output signal, a rectifier (D1) for rectifying the output signal of the amplifier circuit and providing an output signal, and means (203, 205) responsive to the output signal of the rectifier (D1), for switching between two inputs (C or G) of a video terminal (100).

12. A video signal actuated switch as recited in claim 11
further characterized by
means (200) for matching the impedance of the video signal (VS) to the amplifier (201) without degrading the quality of the video signal.

13. A video signal actuated switch as recited in claim 11
further characterized by
means (201a) for tuning the amplifier (201) to the known component frequency of the standard video signal (VS).

14. A video signal actuated switch as recited in claim 11
further characterized in that
the switching means provides a first signal (D) for powering an RF modulator (206), and
a second signal (E) for controlling the selection of inputs (C and G) to the video terminal (100).

15. A video signal actuated switch
characterized by
an amplifier circuit (201) for amplifying an electrical signal of a known component frequency of a video signal (VS), the amplifier circuit providing an output signal, an opto-emitter circuit (D5) for providing an actuating signal (F) responsive to the output signal of amplifier circuit (201), and a control circuit (203, 205), comprising an opto-responder circuit (Q5), for switching between two inputs (C or G) of a video terminal (100) responsive to the actuating signal (F).

* * * * *